(12) United States Patent
Snowder

(10) Patent No.: US 9,697,741 B2
(45) Date of Patent: Jul. 4, 2017

(54) RADIATION TRAINING BOX

(71) Applicant: Travis D Snowder, Idaho Falls, ID (US)

(72) Inventor: Travis D Snowder, Idaho Falls, ID (US)

(*) Notice: Subject to any disclaimer, the term of this patent is extended or adjusted under 35 U.S.C. 154(b) by 0 days.

(21) Appl. No.: 14/850,922

(22) Filed: Sep. 10, 2015

(65) Prior Publication Data

US 2017/0076627 A1    Mar. 16, 2017

(51) Int. Cl.
  *G09B 19/00*    (2006.01)
  *G21F 5/015*    (2006.01)
  *G21F 5/12*    (2006.01)

(52) U.S. Cl.
  CPC .............. *G09B 19/00* (2013.01); *G21F 5/015* (2013.01); *G21F 5/12* (2013.01)

(58) Field of Classification Search
  CPC ........... G09B 19/00; G21F 5/02; G21F 5/015; G21K 5/10
  USPC ...................................................... 250/506.1
  See application file for complete search history.

(56) References Cited

U.S. PATENT DOCUMENTS 5,032,719 A * 7/1991 Gleason ................. G01D 18/00
                                                    250/252.1
5,221,842 A * 6/1993 Shepherd ................. G01T 1/16
                                                    250/252.1

FOREIGN PATENT DOCUMENTS

GB              908134 A  * 10/1962  ............. G21F 5/015

* cited by examiner

*Primary Examiner* — Jack Berman

(57) ABSTRACT

An apparatus used for training purposes contains an external casing, a primary shielding, a secondary shielding, and a control rod. The primary shielding and the secondary shielding are positioned within the external casing. The control rod and the secondary shield are used to adjust the radiation levels emitted from a radiation source placed within a hollow cylindrical portion of the control rod. A first rod receiving hole traverses the primary shielding. Likewise, a second rod receiving hole traverses the secondary shielding. The first rod receiving hole and the second rod receiving hole are concentrically aligned with a central receiving hole of the external casing to form a channel for the control rod to be slidably positioned.

12 Claims, 15 Drawing Sheets

RADIATION TRAINING BOX

The current application claims a priority to the U.S. Provisional Patent application Ser. No. 62/048,300 filed on Sep. 10, 2014.

FIELD OF THE INVENTION

The present invention relates generally to radiation source storage containers. In particular, the present invention introduces an apparatus that can both hold a radiation source and also be used when training personnel with radioactive material.

BACKGROUND OF THE INVENTION

Radiation source training is a process used by the military, emergency and first responder teams, and specialty response groups all over the country. This involves simulating real situations in which high levels of radioactivity may occur. In the field, radiation training objectives include but are not limited to practice with instrument measurement, dose accumulation, dose measurement, dose rate evaluation, instrument performance, instrument capability testing in real space, and emergency response site evaluation.

In the past, there have been issues with radiation source training. Previously, a trainer would take a commercial device or just a regular radiation source that came out of a device and put it in a lead box or container. When training activities take place, the trainer simply pulls out the source, measurements are taken, and then the source is put back in the lead container. While the trainees do get to practice accomplishing various training objectives, realism and application are lacking in this methodology. Just seeing a meter tick is not applicable training to situations in which a bomb goes off or a large fire occurs. Moreover, the way this training is performed causes instruments to give off readings in a realistic manner while those controlling the radiation are not so involved that they affect the realism. Therefore, the need for a method of using the radioactive material in a realistic manner is clearly evident.

Another issue with the existing training methods is the inability to simulate different situations. As an example, the amount of radiation experienced by a medical worker in a lab is different from the amount of radiation experienced by an emergency worker in the field. Resultantly, the trainee is over exposed or under exposed to the radioactive material.

The objective of the present invention is to address the aforementioned issues. More specifically, the present invention introduces an apparatus that allows the user to store a radioactive material. Moreover, the effectiveness of the present invention allows the user to utilize the present in training programs that involve radioactive material. The ability to control the radiation levels emitted from the source, allows the user to simulate different environments through the present invention. When the present invention is not utilized for training purposes, the emitted dosage level is such that members of the public can act and work in the vicinity with no immediate threat.

DETAIL DESCRIPTIONS OF THE INVENTION

All illustrations of the drawings are for the purpose of describing selected versions of the present invention and are not intended to limit the scope of the present invention.

The present invention introduces an apparatus that can be used to store a radiation source. More specifically, the present invention can be used during training procedures to store a radiation source and also to control the radiation levels of the source. As a result, the trainees are allowed to practice under realistic conditions.

Figure 1:
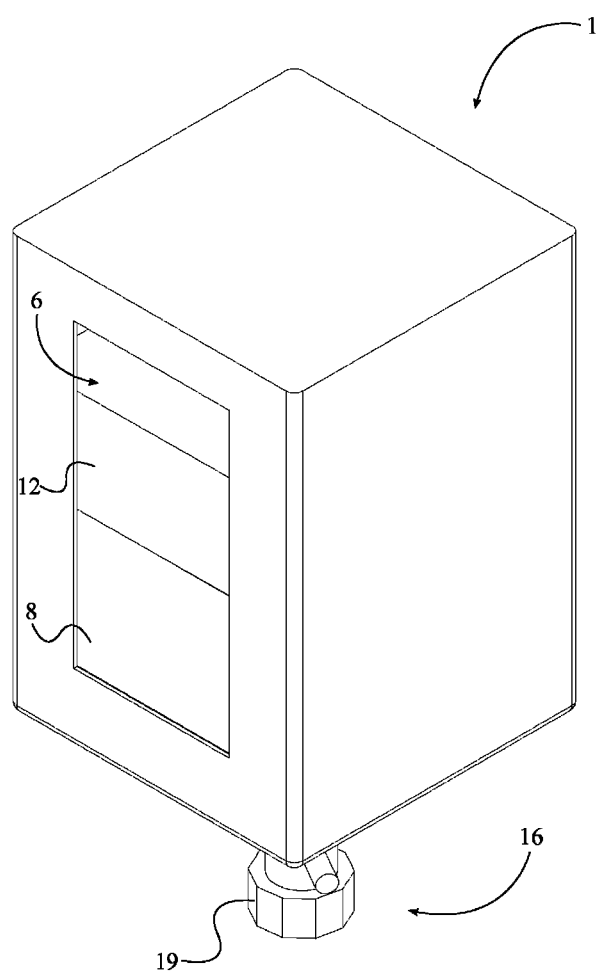
FIG. 1 is a perspective view of the present invention.
Figure 4:
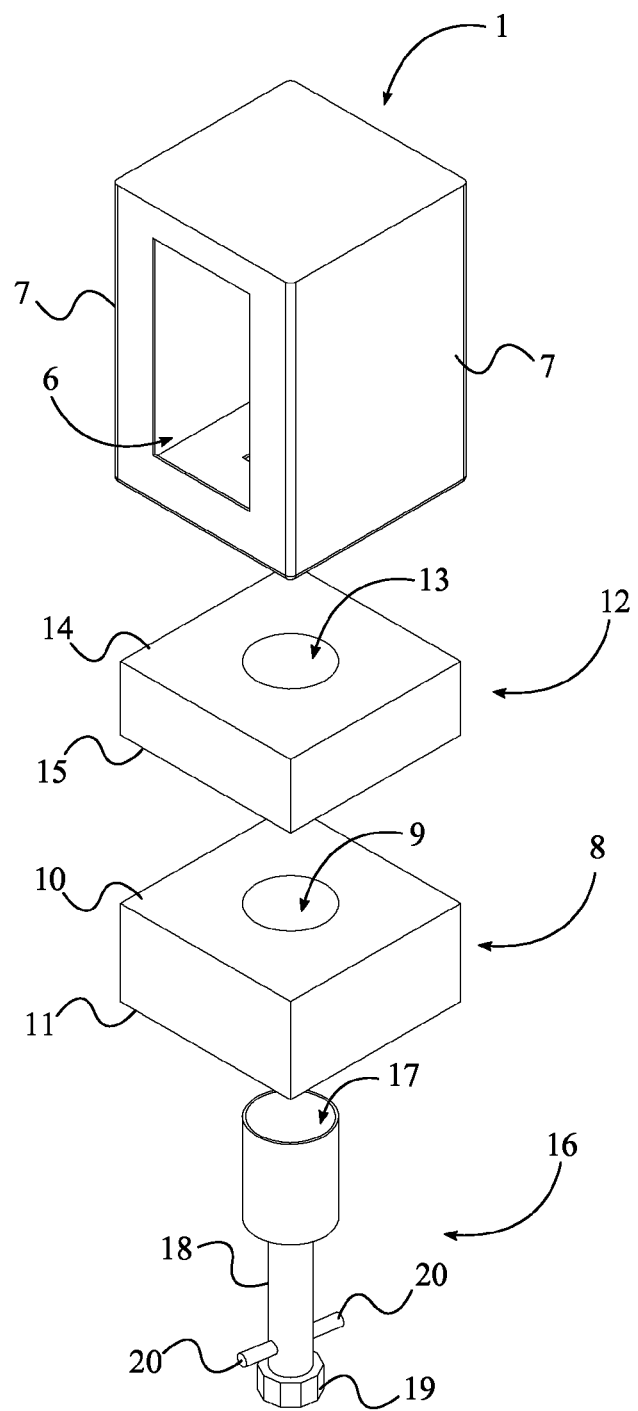
FIG. 4 is an exploded view of the present invention.
Figure 5:
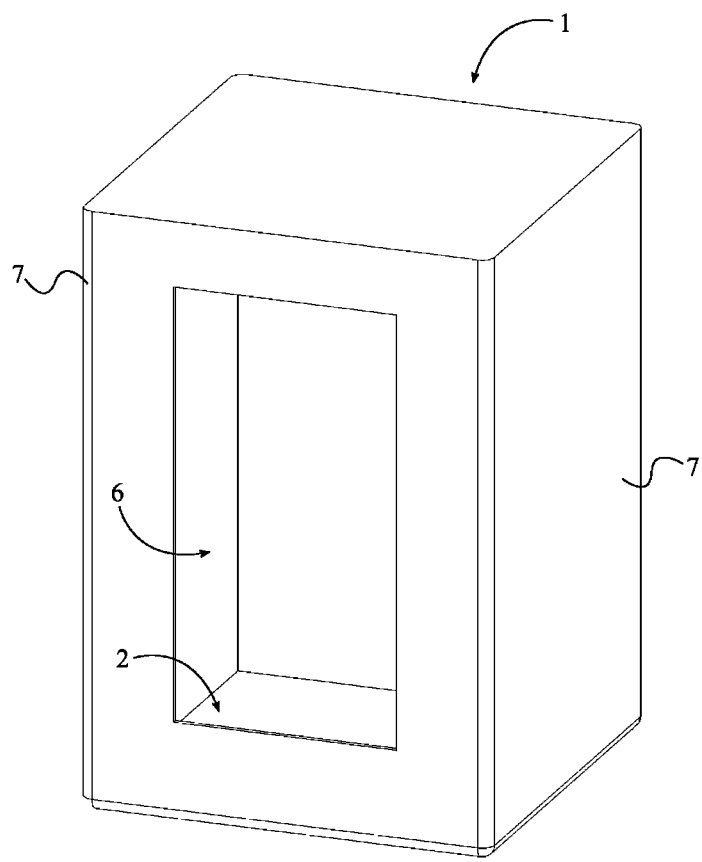
FIG. 5 is a perspective view of the external casing.
Figure 7:
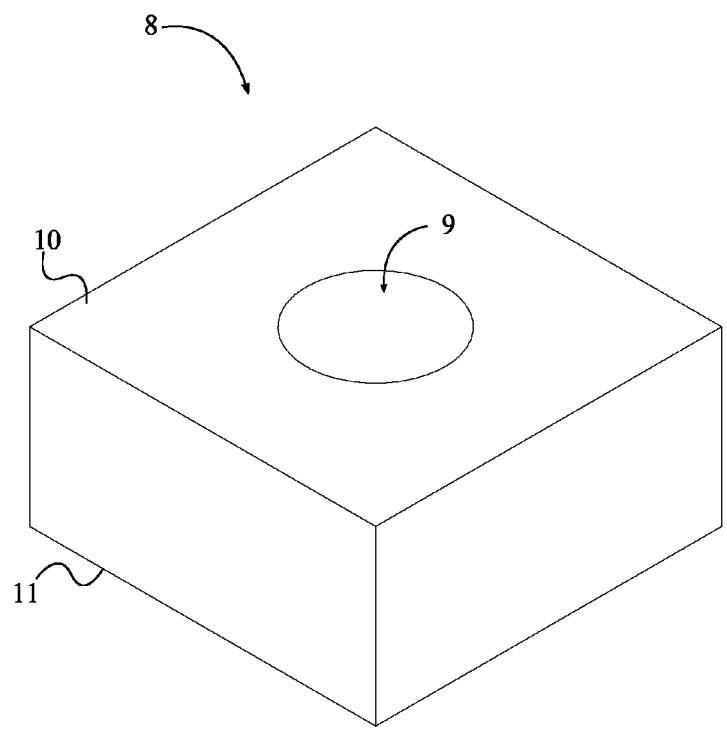
FIG. 7 is a perspective view of the primary shielding.
Figure 9:
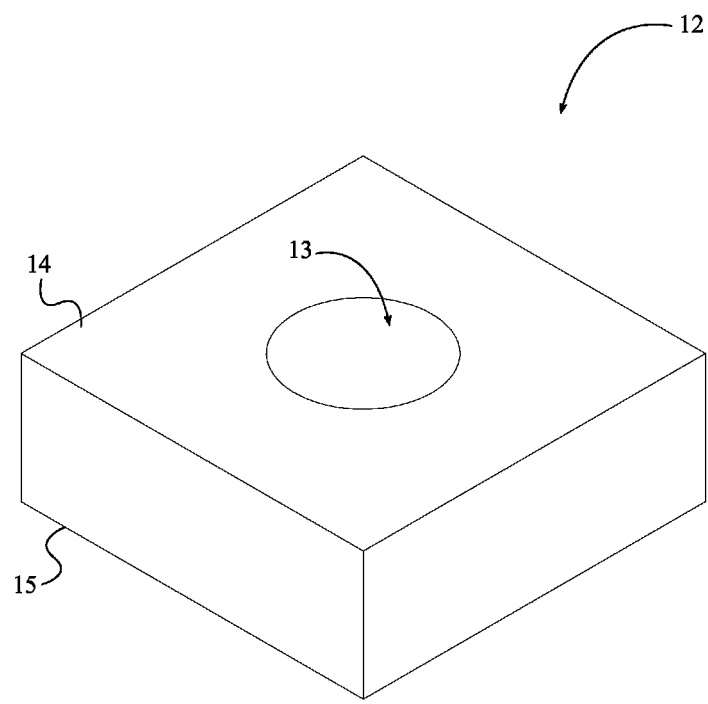
FIG. 9 is a perspective view of the secondary shielding.

As illustrated in FIG. 1 and FIG. 4, the present invention comprises an external casing 1, a primary shielding 8, a secondary shielding 12, and a control rod 16. The external casing 1 acts as the overall housing for the present invention. The primary shielding 8 and the secondary shielding 12, which are the nearest to the radiation source, cover the radiation source such that complete exposure of the radiation source is eliminated. In the preferred embodiment of the present invention, the primary shielding 8 is fixed and the secondary shielding 12 is removably attached. However, the primary shielding 8 and the secondary shielding 12 can be either fixed or removably attached in different embodiments of the present invention. The primary shielding 8 and the secondary shielding 12 can be made of lead or other comparable material that limits radiation. Even though the primary shielding 8 and the secondary shielding 12 are rectangular in shape in the preferred embodiment of the present invention, the shape can vary in different embodiments of the present invention. The control rod 16 is utilized to control the position of the radiation source such that the overall dosage levels of the radiation source can be controlled. The external casing 1 comprises a base section 2 and a central receiving hole 3. The central receiving hole 3 traverses through the base section 2 and acts as the outermost entry point for the control rod 16. In the preferred embodiment of the present invention, the external casing 1 is rectangular in shape as seen in FIG. 5. However, the shape of the external casing 1 can vary in different embodiments of the present invention. The primary shielding 8 and the secondary shielding 12 are positioned within the external casing 1. In particular, the primary shielding 8 is positioned adjacent the base section 2. The secondary shielding 12 is positioned adjacent the primary shielding 8 and opposite the base section 2. In the preferred embodiment of the present invention, the secondary shielding 12 is positioned atop the primary shielding 8. However, the secondary shielding 12 can be positioned in different orientations in other embodiments of the present invention. When the secondary shielding 12 is positioned adjacent the primary shielding 8, a second rod receiving hole 13 of the secondary shielding 12 is concentrically aligned with a first rod receiving hole 9 of the primary shielding 8. As shown in FIG. 7, the first rod receiving hole 9 traverses from a bottom surface 11 of the primary shielding 8 to a top surface 10 of the primary shielding 8. Similarly, the second rod receiving hole 13 also traverses from a bottom surface 15 of the secondary shielding 12 to a top surface 14 of the secondary shielding 12 as shown in FIG. 9. Next, both the first rod receiving hole 9 and the second rod receiving hole 13 are concentrically aligned with the central receiving hole 3 to form a channel 21. The channel 21 is utilized to move the radiation source to different positions within the external casing 1. In order to do so, the control rod 16 traverses into the channel 21 through the central receiving hole 3. As a result, a hollow cylindrical portion 17 of the control rod 16, which is used to store the radiation source is slidably positioned within the channel 21. Similar to the primary shielding 8 and the secondary shielding 12, the hollow cylindrical portion 17 can also contain a lead shielding for additional protection.

The external casing 1 further comprises a plurality of lateral walls 7. The height of the external casing 1 is determined by the height of the plurality of lateral walls 7. Each of the plurality of lateral walls 7 is adjacently connected to the base section 2. Since the primary shielding 8 and the secondary shielding 12 are positioned within the external casing 1, the primary shielding 8 and the secondary shielding 12 are surrounded by the plurality of lateral walls 7. The height of the plurality of lateral walls 7 can differ from one embodiment of the present invention to another. However, the height of each of the plurality of lateral walls 7 exceeds a combined height achieved when the secondary shielding 12 is positioned adjacent the primary shielding 8. As a result, a majority of both the primary shielding 8 and the secondary shielding 12 are concealed by the plurality of lateral walls 7.

Figure 10:
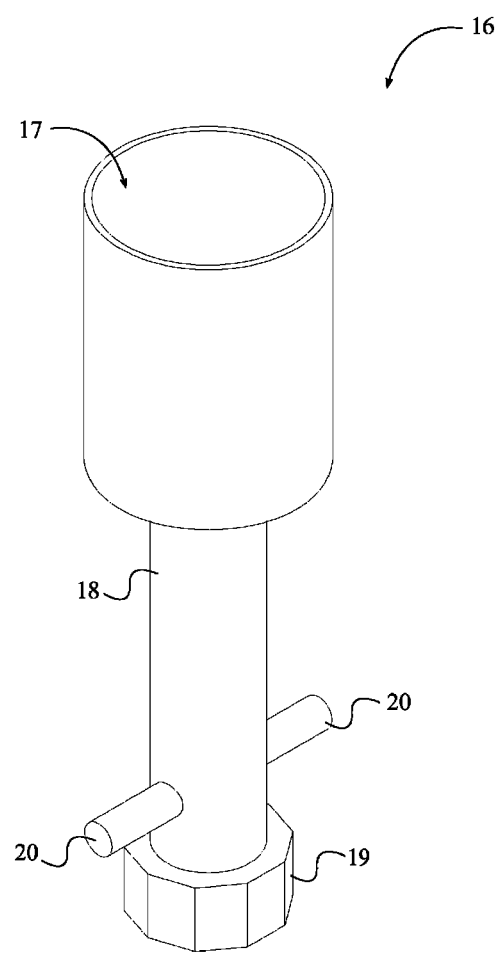
FIG. 10 is a perspective view of the control rod.

As mentioned earlier, the control rod 16 is used to control the position of the radiation source which is placed within the hollow cylindrical portion 17. In addition to the hollow cylindrical portion 17, the control rod 16 comprises a body 18, a handle 19, and a set of locking pins 20 as illustrated in FIG. 10. The hollow cylindrical portion 17 is adjacently connected to the body 18 opposite the handle 19. The handle 19 is adjacently connected to the body 18 and is utilized to grasp the control rod 16 comfortably. The shape and size of the handle 19 can vary in different embodiments of the present invention. The set of locking pins 20 is used to position the hollow cylindrical portion 17 of the control rod 16 in an exposed configuration. In order to do so, the set of locking pins 20 extend outwards from the body 18 and is positioned adjacent the handle 19.

Figure 6:
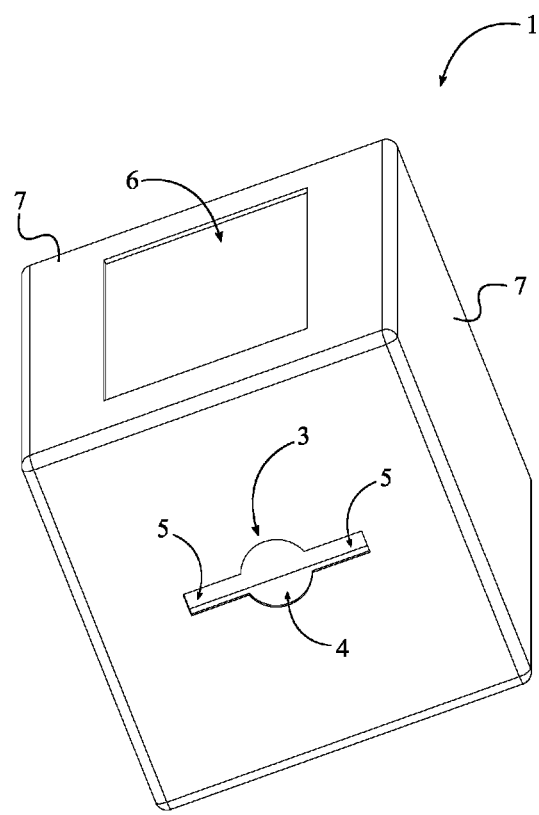
FIG. 6 is a bottom perspective view of the external casing.

The control rod 16 traverses into the channel 21 through the central receiving hole 3. In order to receive the control rod 16, the central receiving hole 3 comprises a cylindrical portion 4 and a set of extended cavities 5 as shown in FIG. 6. Each of the set of extended cavities 5, positioned adjacent the cylindrical portion 4, is sufficiently sized to receive the set of locking pins 20. In order to do so, the set of locking pins 20 is aligned with the set of extended cavities 5. Moreover, the body 18 of the control rod 16 is concentrically aligned with the cylindrical portion 4.

Figure 2A:
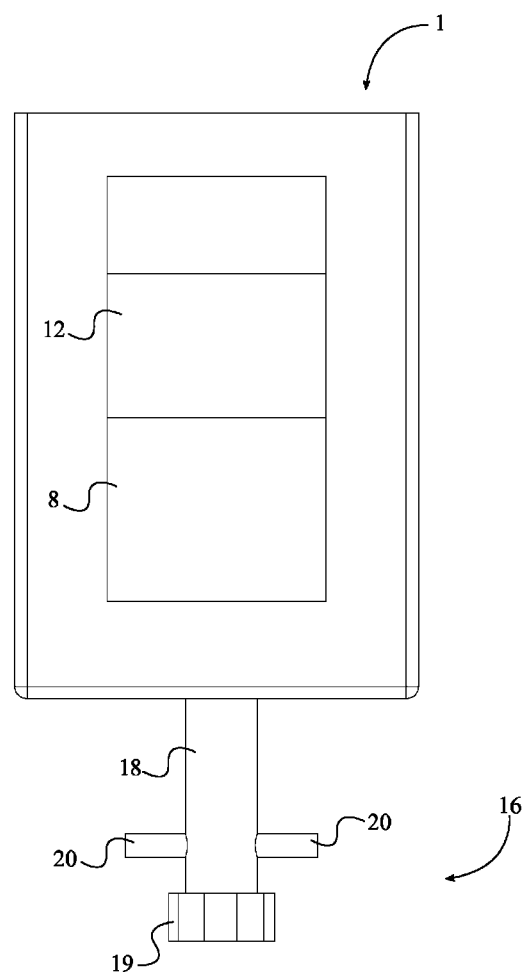
FIG. 2A is a front view of the present invention, wherein the hollow cylindrical portion is in a shielded configuration.
Figure 2B:
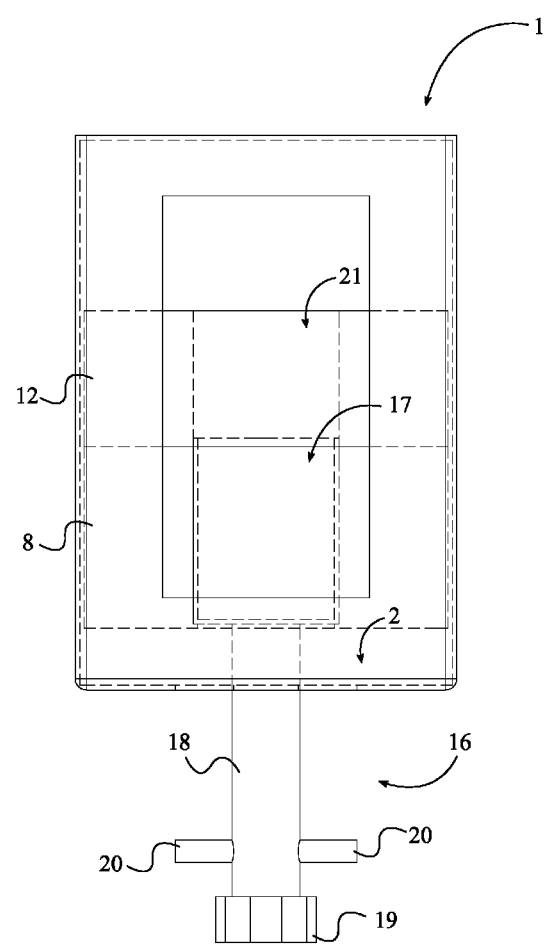
FIG. 2B is another front view of the present invention, wherein the hollow cylindrical portion is in the shielded configuration.
Figure 8:
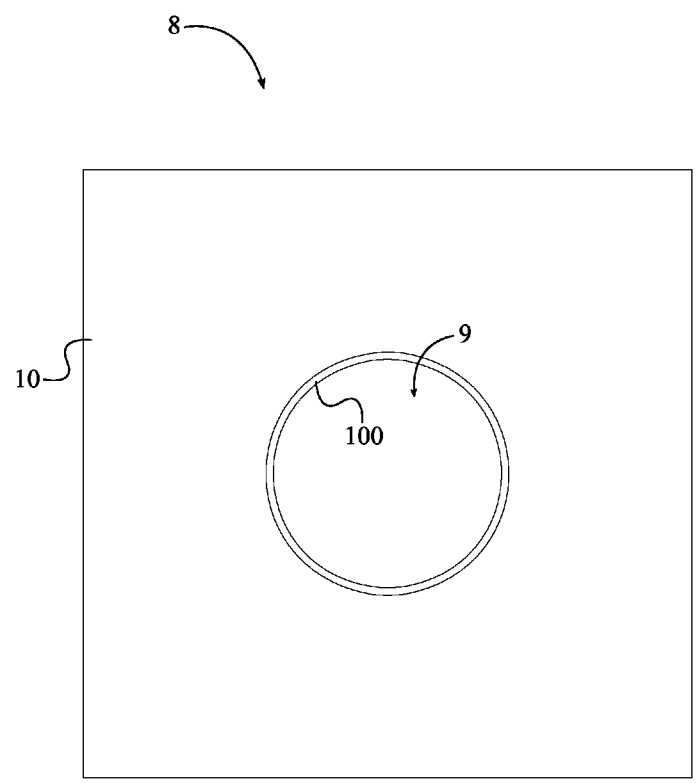
FIG. 8 is a top view of the primary shielding.

The positioning of the primary shielding 8 allows the control rod 16 to be placed in two configurations. More specifically, the primary shielding 8 is offset from the base section 2 such that the hollow cylindrical portion 17 can be in a shielded configuration and also in the exposed configuration. In the shielded configuration the set of locking pins 20 is positioned adjacent the base section 2 and opposite the primary shielding 8 as shown in FIG. 2A and FIG. 2B. An inner lip 100 of the primary shielding 8 prevents the hollow cylindrical portion 17 from falling beyond the bottom surface 11 of the primary shielding 8. In particular, the inner lip 100 is positioned within the first rod receiving hole 9 and adjacent the bottom surface 11 of the primary shielding 8 as illustrated in FIG. 8. Therefore, when the hollow cylindrical portion 17 is in the shielded configuration, a bottom surface of the hollow cylindrical portion 17 rests against the inner lip 100.

Figure 3A:
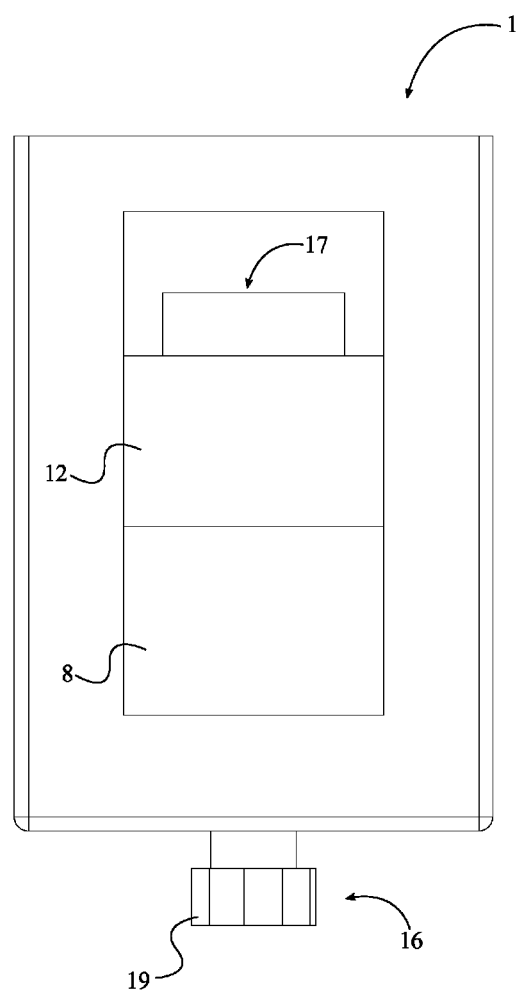
FIG. 3A is a front view of the present invention, wherein the hollow cylindrical portion is in an exposed configuration.
Figure 3B:
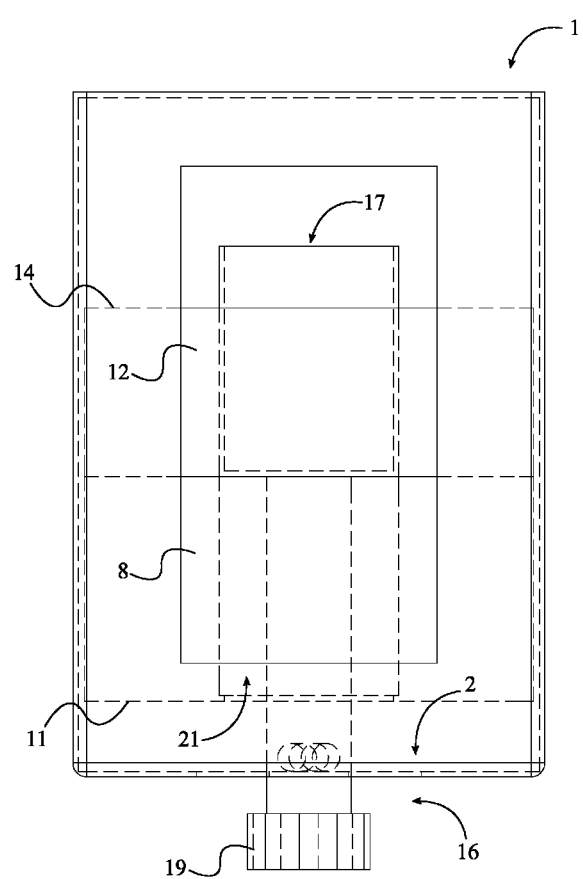
FIG. 3B is another front view of the present invention, wherein the hollow cylindrical portion is the exposed configuration.

FIG. 3A and FIG. 3B illustrate the exposed configuration of the hollow cylindrical portion 17. In the exposed configuration, the set of locking pins 20 rests on the base section 2. More specifically, the set of locking pins 20 is positioned in between the primary shielding 8 and the base section 2. To achieve this configuration, the control rod 16 is pushed upwards at the handle 19 and rotated in a clockwise or a counter clockwise direction such that the set of locking pins 20 are not aligned with the set of extended cavities 5.

Figure 13:
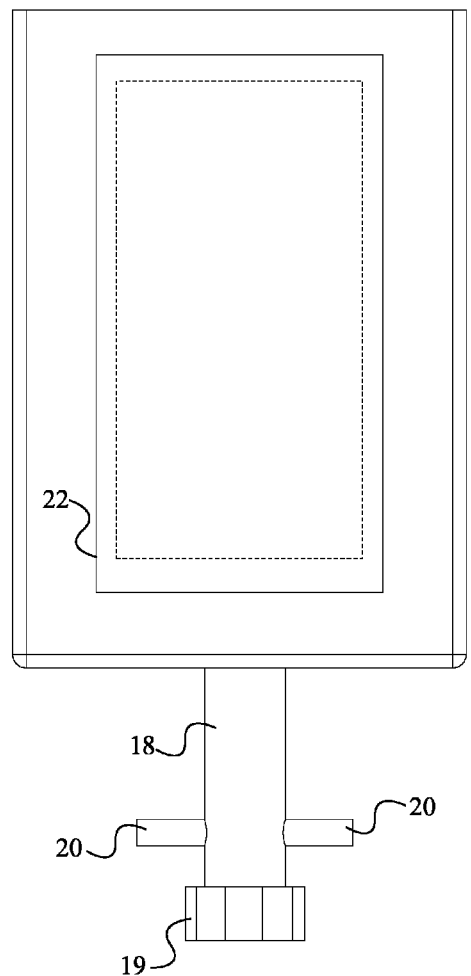
FIG. 13 is a front view illustrating the cover utilized to conceal the opening of the external casing.

As illustrated in FIG. 13, the present invention further comprises a cover 22. The cover 22 is hingedly connected to the external casing 1 opposite the base section 2 such that an opening 6 of the external casing 1 is concealed. The opening 6 is utilized in the process of placing and removing the radioactive source from the hollow cylindrical portion 17. Even though the opening 6 is positioned on a front face of the external casing 1 in the preferred embodiment of the present invention, the opening 6 can also be positioned differently in other embodiments of the present invention.

Figure 11:
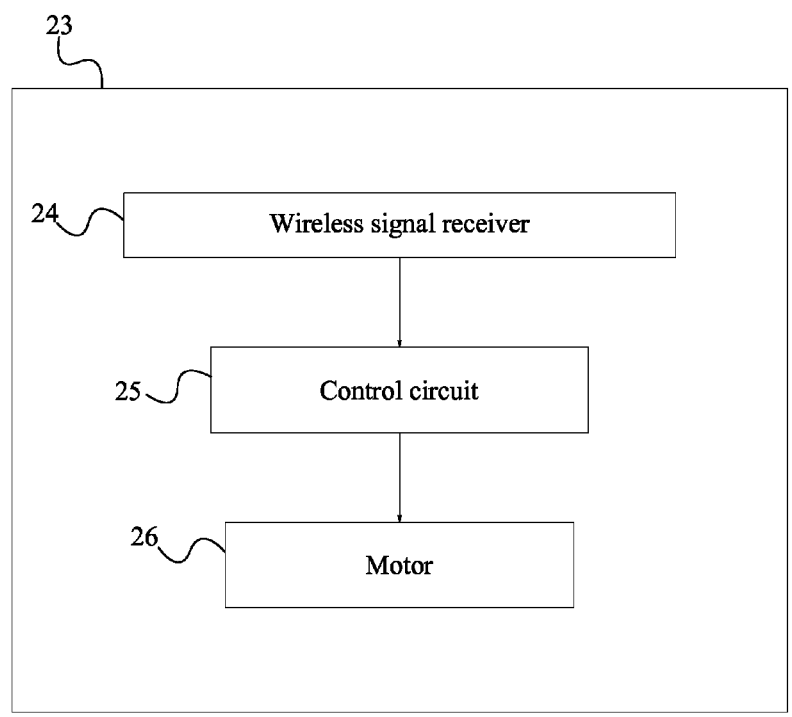
FIG. 11 is a flowchart illustrating the electronic connections within the wireless control unit.
Figure 12:
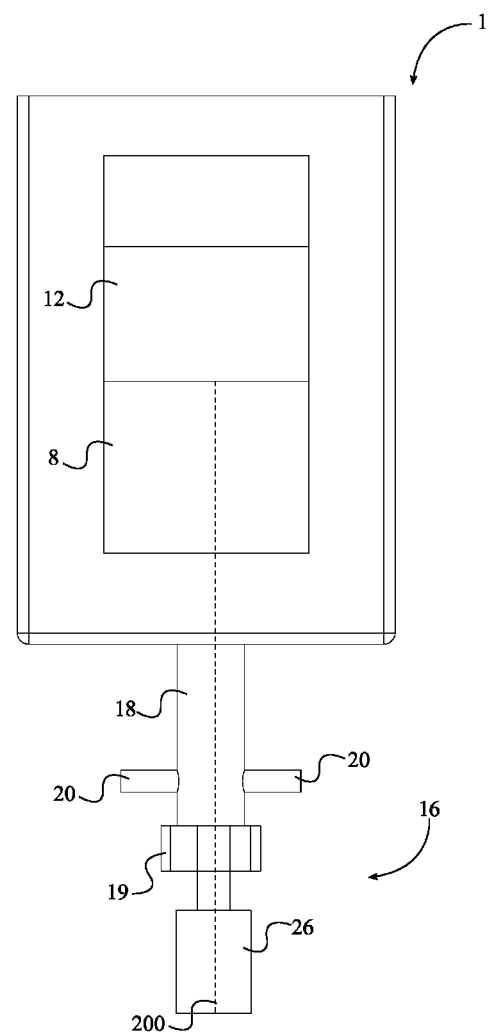
FIG. 12 is a front view of the motor being mechanically engaged to the control rod.

In another embodiment of the present invention, a wireless control unit 23 can be utilized to reposition the radiation source. In such instances, the wireless control unit 23 comprises a wireless signal receiver 24, a control circuit 25, and a motor 26. As illustrated in FIG. 11, the wireless signal receiver 24, the control circuit 25, and the motor 26 are electronically connected to each other. In order to slide the hollow cylindrical portion 17 within the channel 21, the motor 26 is mechanically engaged to the control rod 16 such that the control rod 16 is slidable along a single axis 200 as shown in FIG. 12.

When utilizing the present invention, the following process flow can be followed. However, the process flow can also vary according to user preference. Initially, the radiation source, which can vary according to the training process, is placed in the hollow cylindrical portion 17. In order to do so, the user utilizes the opening 6 of the external casing 1. The positioning of the opening 6 can vary in different embodiments of the present invention. When the radiation source is positioned within the hollow cylindrical portion 17, the user can slide the control rod 16 and thereby the hollow cylindrical portion 17 within the channel 21 such that different dosage levels are emitted from the radiation source. The control rod 16 can be conveniently pushed in the channel 21 since the central receiving hole 3, the first rod receiving hole 9, and the second rod receiving hole 13 are concentrically aligned to form the channel 21. In the preferred embodiment of the present invention, the hollow cylindrical portion 17 can have two configurations. Namely, the shielded configuration and the exposed configuration. However, in different embodiments of the present invention, the hollow cylindrical portion 17 can have additional configurations. The hollow cylindrical portion 17 is in the shielded configuration when the present invention is not in use. In particular, the radiation source is shielded such that a minimum amount of radiation is emitted to the atmosphere. The hollow cylindrical portion 17 rests on the inner lip 100 such that the radiation source is placed within the first rod receiving hole 9. When the present invention is utilized for training purposes, the control rod 16 is pushed towards a top surface 14 of the secondary shielding 12. The set of locking pins 20, which is initially aligned with the set of extended cavities 5 is utilized to lock the control rod 16 in the exposed configuration. In doing so, the set of locking pins 20 is pushed passed the set of extended cavities 5 and rotated such that the set of locking pins 20 is no longer aligned with the set of extended cavities 5. When the control rod 16 is rotated, the set of locking pins 20 rests on the base section 2 in the exposed configuration.

If the embodiment with the wireless control unit 23 is utilized, the user sends out a signal which contains positional information. The signal can be sent out with a mobile device or other comparable communication device containing a signal transmitter. The signal with positional information is received by the wireless signal receiver 24 and transmitted to the control circuit 25. The control circuit 25 then determines the direction in which the control rod 16 needs to move. As a result, the hollow cylindrical portion 17 will either be in a shielded configuration or an exposed configuration.

Although the invention has been explained in relation to its preferred embodiment, it is to be understood that many other possible modifications and variations can be made without departing from the spirit and scope of the invention as hereinafter claimed.

What is claimed is:

1. An apparatus used for storing radioactive material comprising:
    an external casing;
    a primary shielding;
    a secondary shielding;
    a control rod;
    the external casing comprising a base section and a central receiving hole;
    the primary shielding comprising a first rod receiving hole;
    the secondary shielding comprising a second rod receiving hole;
    the control rod comprising a hollow cylindrical portion;
    the primary shielding and the secondary shielding being positioned within the external casing;
    the central receiving hole traversing through the base section;
    the primary shielding being positioned adjacent the base section;
    the secondary shielding being positioned adjacent the primary shielding opposite to the base section;
    the central receiving hole, the first rod receiving hole and the second rod receiving hole being concentrically aligned to each other forming a channel;
    the control rod traversing into the channel through the central receiving hole;
    the hollow cylindrical portion being slidably positioned within the channel;
    the primary shielding further comprising an inner lip, a top surface and a bottom surface;
    the first rod receiving hole traversing from the bottom surface of the primary shielding to the top surface of the primary shielding;
    the inner lip being positioned within the first rod receiving hole and adjacent the bottom surface of the primary shielding; and
    the hollow cylindrical portion resting against the inner lip in response to the hollow cylindrical portion being in a shielded configuration so as to prevent the hollow cylindrical portion from passing through the bottom surface of the primary shielding.

2. The apparatus used for storing radioactive material as claimed in claim 1 further comprising:
    the external casing furtherer comprising a plurality of lateral walls;
    each of the plurality of lateral walls being adjacently connected to the base section; and
    the primary shielding and the secondary shielding being positioned within the plurality of lateral walls.

3. The apparatus used for storing radioactive material as claimed in claim 1 further comprising:
    the control rod further comprising a body, a handle and a set of locking pins;
    the handle being adjacently connected to the body;
    the set of locking pins extending outwards from the body; and
    the set of locking pins being positioned adjacent the handle.

4. The apparatus used for storing radioactive material as claimed in claim 3 further comprising the hollow cylindrical portion being adjacently connected to the body, opposite the handle.

5. The apparatus used for storing radioactive material as claimed in claim 1 further comprising the primary shielding being offset from the base section.

6. The apparatus used for storing radioactive material as claimed in claim 1 further comprising:
    the secondary shielding further comprising a top surface and a bottom surface; and
    the second rod receiving hole traversing from the bottom surface of the secondary shielding to the top surface of the secondary shielding.

7. The apparatus used for storing radioactive material as claimed in claim 1 further comprising:
    the central receiving hole comprising a cylindrical portion and a set of extended cavities; and
    each of the set of extended cavities being positioned adjacent the cylindrical portion.

8. The apparatus used for storing radioactive material as claimed in claim 7 further comprising:
    the control rod further comprising a body and a set of locking pins;
    the set of locking pins extending outwards from the body;
    the set of locking pins being aligned with the set of extended cavities; and
    the body being concentrically aligned with the cylindrical portion.

9. The apparatus used for storing radioactive material as claimed in claim 1 further comprising:
    the control rod further comprising a set of locking pins; and
    the set of locking pins being positioned adjacent to the base section and opposite the primary shielding.

10. The apparatus used for storing radioactive material as claimed in claim 1 further comprising:
    the control rod further comprising a set of locking pins; and the set of locking pins being positioned in between the primary shield and the base section in response to the hollow cylindrical portion being in an exposed configuration.

11. The apparatus used for storing radioactive material as claimed in claim 1 further comprising:

a cover; and the cover being hingedly connected to the external casing opposite the base section for concealing an opening of the external casing.

12. The apparatus used for storing radioactive material as claimed in claim 1 further comprising:

a wireless control unit;

the wireless control unit comprising a wireless signal receiver, a control circuit and a motor;

the wireless signal receiver, the control circuit and the motor being electronically connected to each other;

the motor being mechanically engaged to the control rod; and the control rod being slidable along a single axis.

* * * * *